(12) United States Patent
Sobieski et al.

(10) Patent No.: US 9,061,614 B2
(45) Date of Patent: Jun. 23, 2015

(54) HEIGHT ADJUSTABLE HEAD RESTRAINTS FOR VEHICLE SEATS

(75) Inventors: Zdzislaw Sobieski, Eching (DE); Karsten Mueller, Ingolstadt (DE); Ralph Fey, Zirndorf (DE)

(73) Assignee: Lear Corporation, Southfield, MI (US)

( * ) Notice: Subject to any disclaimer, the term of this patent is extended or adjusted under 35 U.S.C. 154(b) by 500 days.

(21) Appl. No.: 13/430,935

(22) Filed: Mar. 27, 2012
(Under 37 CFR 1.47)

(65) Prior Publication Data
US 2013/0049430 A1  Feb. 28, 2013

(30) Foreign Application Priority Data

Mar. 28, 2011  (DE) .......................... 10 2011 006 243

(51) Int. Cl.
*B60N 2/48* (2006.01)

(52) U.S. Cl.
CPC ............ *B60N 2/4829* (2013.01); *B60N 2/4805* (2013.01); *B60N 2/4864* (2013.01); *B60N 2/4808* (2013.01); *B60N 2/48* (2013.01); *B60N 2002/4897* (2013.01); *B60N 2002/4894* (2013.01)

(58) Field of Classification Search
CPC ...................... B60N 2/4864; B60N 2002/4894; B60N 2/4808; B60N 2/4805; B60N 2/48; B60N 2/4817; B60N 2/4882; B60N 2/4829; B60N 2/4879; B60N 2002/4897; B60N 2/2851; A47C 7/38; A47C 7/383; A47C 1/10; A47C 1/06
USPC .......................... 297/410, 391, 404, 406, 407
See application file for complete search history.

(56) References Cited

U.S. PATENT DOCUMENTS

| | | | |
|---|---|---|---|
| 4,222,608 A | * | 9/1980 | Maeda .......................... 297/410 |
| 4,265,482 A | | 5/1981 | Nishimura et al. |
| 4,674,797 A | | 6/1987 | Tateyama |

(Continued)

FOREIGN PATENT DOCUMENTS

| | | |
|---|---|---|
| CN | 101659228 A | 3/2010 |
| CN | 101927715 A | 12/2010 |

(Continued)

OTHER PUBLICATIONS

Chinese Office Action for corresponding Application No. 201210065315.5, mailed Feb. 24, 2014, 7 pages.

(Continued)

*Primary Examiner* — Joshua J Michener
*Assistant Examiner* — Matthew Gitlin
(74) *Attorney, Agent, or Firm* — Brooks Kushman P.C.

(57) ABSTRACT

A height adjustable head restraint assembly is provided with an upright guide adapted to be mounted to a vehicle body proximate to a seat back. The guide has a cross section. A frame has a cavity with a cross section oversized relative to that of the guide to receive the guide. At least one of the guides in the frame has a plurality of projections extending to engage the other for providing guidance therebetween. A head restraint is mounted to the frame for translation along the guide. A motor is mounted to the frame for driving a threaded rod that is engaged with a fixed nut that is mounted to the guide for translating the head restraint. A pair of conductive brushes is provided on the guide and a pair of conductive contacts is mounted to the frame in electrical communication with the motor for providing power to the motor.

17 Claims, 3 Drawing Sheets

(56) References Cited

U.S. PATENT DOCUMENTS

| | | | |
|---|---|---|---|
| 4,765,683 A * | 8/1988 | Hattori | 297/410 |
| 5,026,120 A * | 6/1991 | Takeda et al. | 297/408 |
| 5,205,585 A * | 4/1993 | Reuber et al. | 280/753 |
| 5,222,784 A * | 6/1993 | Hamelin | 297/408 |
| 5,433,508 A * | 7/1995 | Akima et al. | 297/410 |
| 5,992,939 A | 11/1999 | Gass et al. | |
| 6,062,644 A * | 5/2000 | Lance | 297/410 |
| 6,082,817 A | 7/2000 | Muller | |
| 6,364,415 B1 * | 4/2002 | Mori et al. | 297/410 |
| 6,390,558 B2 | 5/2002 | Fischer et al. | |
| 6,471,296 B2 * | 10/2002 | Lance | 297/410 |
| 6,543,852 B2 * | 4/2003 | Mori | 297/410 |
| 6,688,697 B2 | 2/2004 | Baumann et al. | |
| 6,715,829 B2 | 4/2004 | Svantesson et al. | |
| 6,767,064 B2 * | 7/2004 | Veine et al. | 297/391 |
| 6,805,411 B2 | 10/2004 | Gramss et al. | |
| 6,899,395 B2 * | 5/2005 | Yetukuri et al. | 297/408 |
| 7,048,336 B2 | 5/2006 | Mawbey et al. | |
| 7,070,235 B2 | 7/2006 | Schilling et al. | |
| 7,073,863 B1 | 7/2006 | Low et al. | |
| 7,111,901 B2 | 9/2006 | Schlierf et al. | |
| 7,137,668 B2 | 11/2006 | Kreitler | |
| 7,195,313 B2 | 3/2007 | Hippel et al. | |
| 7,232,187 B1 * | 6/2007 | Sundararajan et al. | 297/410 |
| 7,758,127 B2 * | 7/2010 | Bokelmann et al. | 297/410 |
| 8,038,219 B2 * | 10/2011 | Boes et al. | 297/410 |
| 8,272,696 B2 * | 9/2012 | Hong | 297/410 |
| 8,573,702 B2 * | 11/2013 | Tscherbner et al. | 297/410 |
| 2001/0028191 A1 * | 10/2001 | Lance | 297/410 |
| 2001/0040396 A1 | 11/2001 | Kreuels et al. | |
| 2004/0195894 A1 | 10/2004 | Pal et al. | |
| 2005/0077762 A1 | 4/2005 | Kraemer et al. | |
| 2005/0088027 A1 | 4/2005 | Yetukuri et al. | |
| 2005/0116515 A1 | 6/2005 | Schlierf et al. | |
| 2006/0071518 A1 | 4/2006 | Hippel et al. | |
| 2006/0226688 A1 | 10/2006 | Terada et al. | |
| 2006/0250017 A1 | 11/2006 | Otto et al. | |
| 2007/0216211 A1 | 9/2007 | Mori | |
| 2009/0058162 A1 * | 3/2009 | Boes et al. | 297/406 |
| 2009/0058163 A1 * | 3/2009 | Bokelmann et al. | 297/410 |
| 2009/0184556 A1 * | 7/2009 | Bokelmann et al. | 297/410 |
| 2011/0031796 A1 * | 2/2011 | Hong | 297/410 |

FOREIGN PATENT DOCUMENTS

| | | |
|---|---|---|
| DE | 69112958 T2 | 4/1996 |
| DE | 19954862 A1 | 8/2000 |
| DE | 10035972 A1 | 2/2001 |
| DE | 102004005695 A1 | 8/2004 |
| DE | 102004055986 A1 | 6/2006 |
| DE | 102005020276 B3 | 9/2006 |
| DE | 102006015785 A1 | 10/2006 |
| EP | 1717099 A2 | 11/2006 |
| FR | 2852066 A1 | 9/2004 |
| GB | 2340744 A | 3/2000 |
| WO | 2004089688 A1 | 10/2004 |
| WO | 2007073034 A1 | 6/2007 |
| WO | 2010058306 A1 | 5/2010 |

OTHER PUBLICATIONS

German Office Action for corresponding Application No. 10 2011 006 243.2, mailed Dec. 28, 2011, 8 pages.
Chinese Office Action for corresponding Application No. 201210065315.5, mailed Oct. 29, 2014, 10 pages.

* cited by examiner

HEIGHT ADJUSTABLE HEAD RESTRAINTS FOR VEHICLE SEATS

CROSS-REFERENCE TO RELATED APPLICATIONS

This application claims foreign priority benefits under 35 U.S.C. §119(a)-(d) to DE 10 2011 006 243.2, filed Mar. 28, 2011, which is hereby incorporated by reference in its entirety.

TECHNICAL FIELD

Various embodiments relate to a vehicle seat assembly having a movable head restraint.

BACKGROUND

Movable head restraints permit adjustment of a head restraint relative to a seat assembly. One such example is disclosed in U.S. Pat. No. 6,899,395 B2 to Yetukuri et al.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
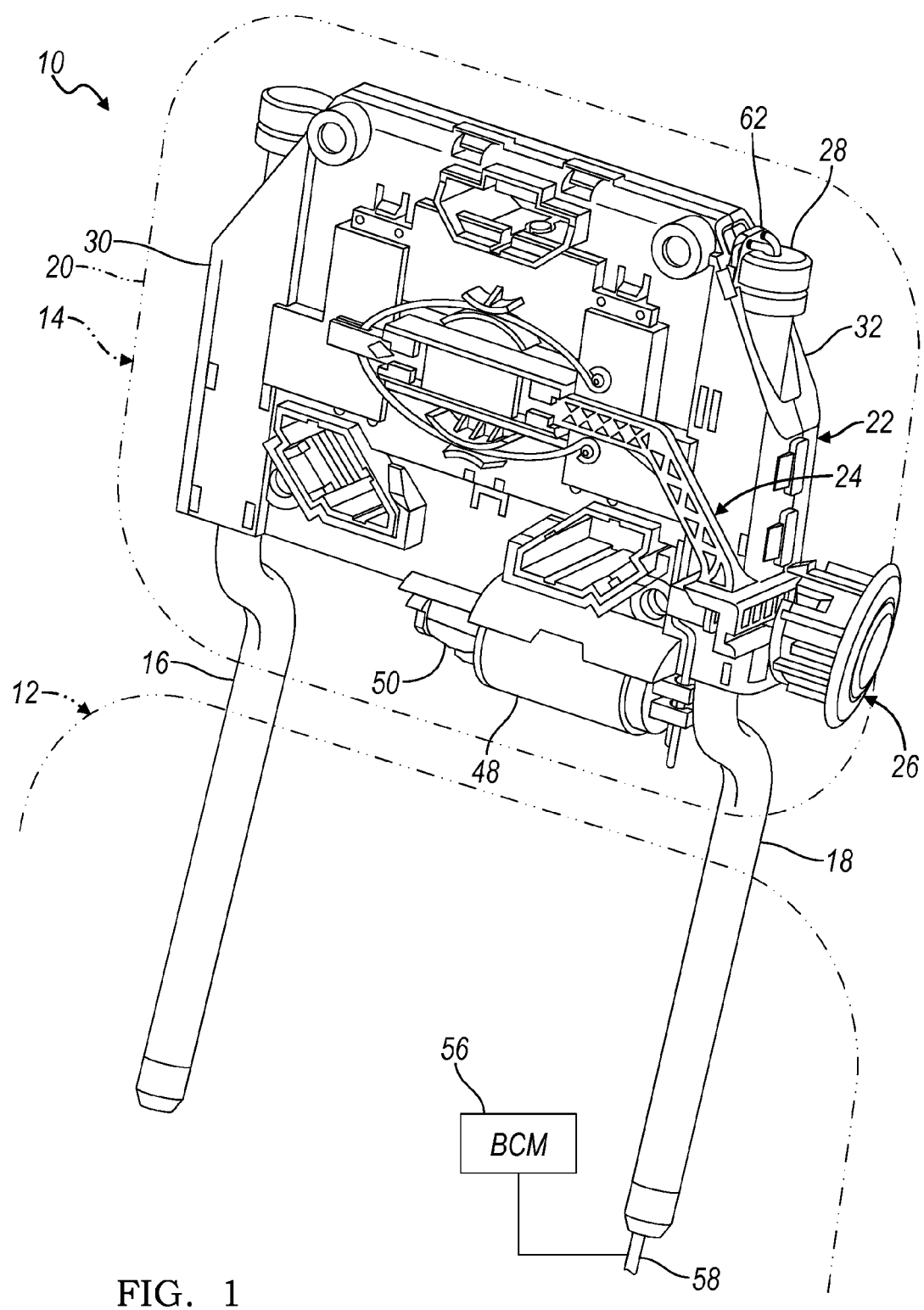
FIG. 1 is a front perspective view of a head restraint assembly according to an embodiment, illustrated in a lowermost position.

Referring to FIG. 1, a movable head restraint assembly is illustrated and referenced generally by numeral 10. The head restraint assembly 10 is provided adjacent a seat back 12 of a vehicle seat and may be mounted directly to the vehicle seat or directly to the vehicle body adjacent the seat back 12 for supporting a head of an occupant. The seat assembly may be for a vehicle such as a car, truck, aircraft, watercraft, or the like. The head restraint assembly 10 is illustrated including a head restraint 14 provided upon a pair of support posts 16, 18. The support posts 16, 18 may be fixed relative to the vehicle or the vehicle seat back 12. The support posts 16, 18 may be mounted to a frame of the seat back 12. The support posts 16, 18 may have any suitable configuration. For example, the support posts 16, 18 may be formed integrally as one generally U-shaped configuration, or may be formed as a pair of separate components as depicted. The support posts 16, 18 may be made of any suitable material or materials such as a metal or metal alloy.

The head restraint 14 may include a trim cover 20 for enclosing a cushion (not shown), a housing 22, and a locking mechanism 24. A manual button assembly 26 extends from the housing 22 and the trim cover 20 for manual actuation for disengaging the locking mechanism 24. The button assembly 26 is illustrated oriented to be manually actuated. According to one embodiment, actuation of the button assembly 26 disengages the locking mechanism 24 for actuating the head restraint 14 in a fore and aft direction. One suitable locking mechanism is disclosed in U.S. Patent Application Publication No. 2010/0270841 A1, which published to Sobieski et al. on Oct. 28, 2010; and which was also filed in Germany as Patent Application No. 10 2010 003 349.9 on Mar. 26, 2010; the disclosures of which are incorporated by reference herein. Another suitable mechanism is disclosed in German Patent Application No. 10 2010 041 942.7 filed on Oct. 4, 2010; the disclosure of which is incorporated by reference herein. The button assembly 26 may be utilized for disengaging the locking mechanism 24 for adjustment in the fore and aft direction; and/or may also be employed for height adjustment of the head restraint assembly 10 relative to the seat back 12. Suitable button assemblies are disclosed in German Patent Application No. 10 2010 041 941.9 filed on Oct. 4, 2010; which is also incorporated by reference herein.

Figure 2:
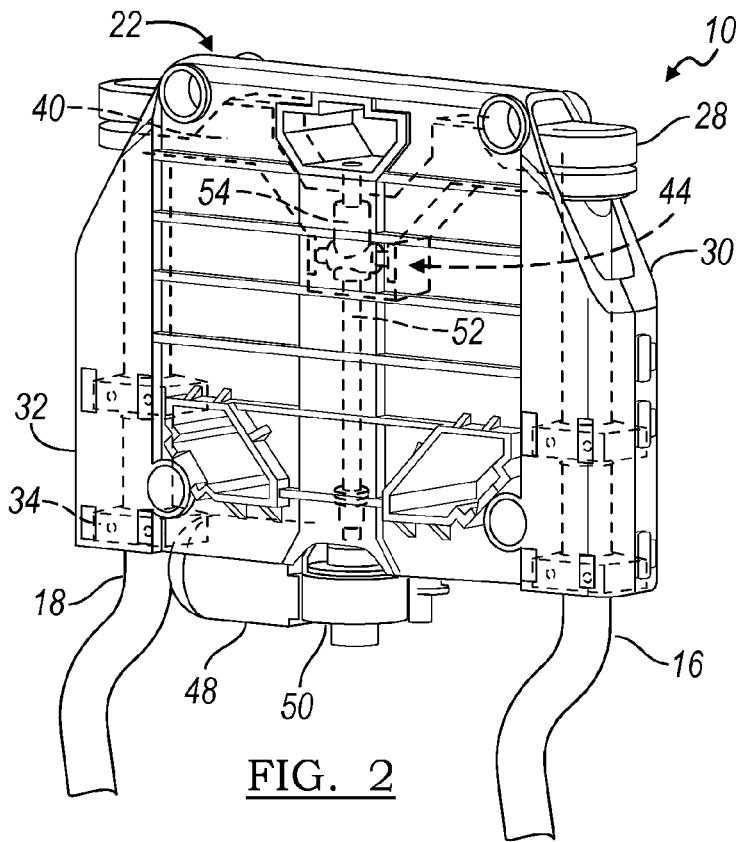
FIG. 2 is a rear perspective view of the head restraint assembly of FIG. 1, also illustrated in the lowermost position.
Figure 3:
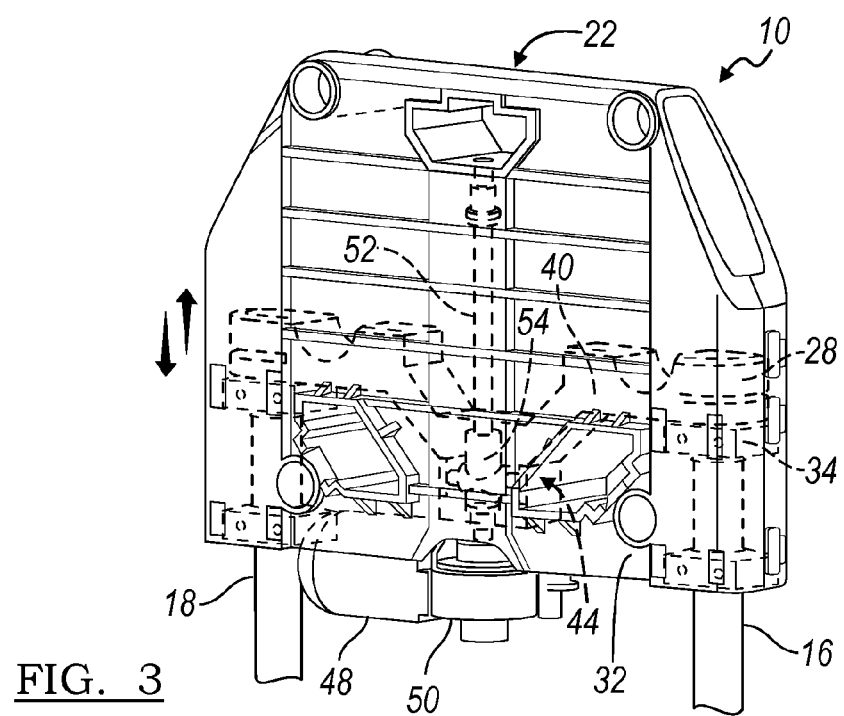
FIG. 3 is another rear perspective view of the head restraint assembly of FIG. 1, illustrated in an uppermost position.

For the depicted embodiment, the stationary components of the head restraint assembly 10 are the support posts 16, 18 and a transverse crossbar 28. The transverse crossbar 28 is illustrated in FIGS. 1-3 and is mounted to distal ends of the support posts 16, 18. The support posts 16, 18 and transverse crossbar 28 collectively provide a guide for translation of the head restraint 14 relative to the seat back 12.

The housing 22 is provided by a front shell 30 and a rear shell 32 that provide a frame for the head restraint 14 and cooperate with the transverse crossbar 28 and support posts 16, 18 for translation along the guide. The housing 22 is illustrated in a lowermost position of a range of travel in FIGS. 1 and 2; and the housing 22 is illustrated in an uppermost position of the range of travel in FIG. 3. The housing 22 includes a plurality of guide bushings 34, which are illustrated and described in International Patent Application No. PCT/US10/37725, which was filed on Jun. 8, 2010 and is incorporated by reference herein.

Figure 4:
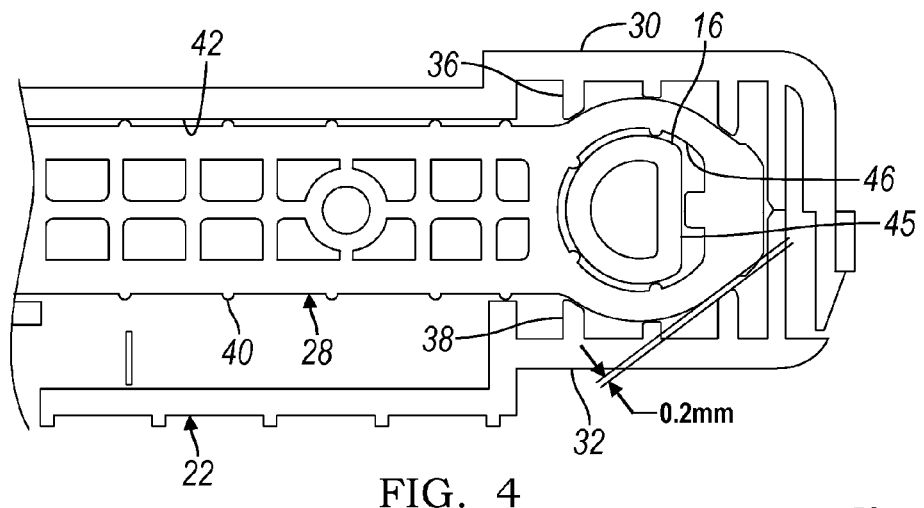
FIG. 4 is a partial section view of a region of the head restraint assembly of FIG. 1.

To provide further guidance between the housing 22 and the guide, the front and rear shells 30, 32 engage the transverse crossbar 28, as illustrated in FIG. 4. In the outboard lateral regions of the shells 30, 32 a plurality of ribs 36, 38 extend in a fore and aft direction for engaging the transverse crossbar 28. These ribs 36, 38 also extend longitudinally through the shells 30, 32 along a range of translation of the head restraint 14 for maintaining contact with the transverse crossbar 28 and providing guidance. A clearance of approximately 0.2 millimeters is provided between each rib 36, 38 and the transverse crossbar 28 according to at least one embodiment.

Additionally, a series of longitudinal ribs 40 extend from the transverse crossbar 28 in a central region for engaging a cavity 42 provided between the front and rear shells 30, 32. Referring again to FIGS. 2 and 3, a central portion 44 of the transverse crossbar 28 extends longitudinally downward relative to the lateral ends of the transverse crossbar 28. The central region 44 provides clearance for the locking mechanism 24 (shown in FIG. 1) in the lowermost position in FIG.

2. Additionally, this extension maintains a longitudinal range of engagement between the housing 22 and the transverse crossbar 28.

Referring again to FIG. 4, the support post 16 has a round cross section with a flat 45 formed on an outboard lateral side thereof. The transverse crossbar 28 has a pair of cavities 46 that are each sized to receive one of the support posts 16 therein.

According to one embodiment, the translation of the head restraint 14 along the transverse crossbar 28 and support posts 16, 18 is motor-driven. Accordingly, a motor 48 is mounted to the housing 22 and extends transversely as illustrated in FIGS. 1-3 for compactness of the overall head restraint assembly 10. A transmission 50 is driven by the motor 48 for reducing rotation provided by the motor 48, enhancing torque and for converting the rotary motion for rotation about a transverse axis to a longitudinal axis. The motor 48 is oriented offset from center so that the transmission 50 can be oriented centrally. A threaded rod 52 extends longitudinally from the transmission 50 and engages a fixed nut 54 that is retained within the central region 44 of the crossbar 28. Operation of the motor 48 drives the transmission 50 and consequently the threaded rod 52, which is engaged to the fixed nut 54 for moving the threaded rod 52, and consequently the transmission 50, motor 48, shells 30, 32 and the head restraint 14 relative to the support posts 16, 18 and the transverse crossbar 28.

Figure 5:
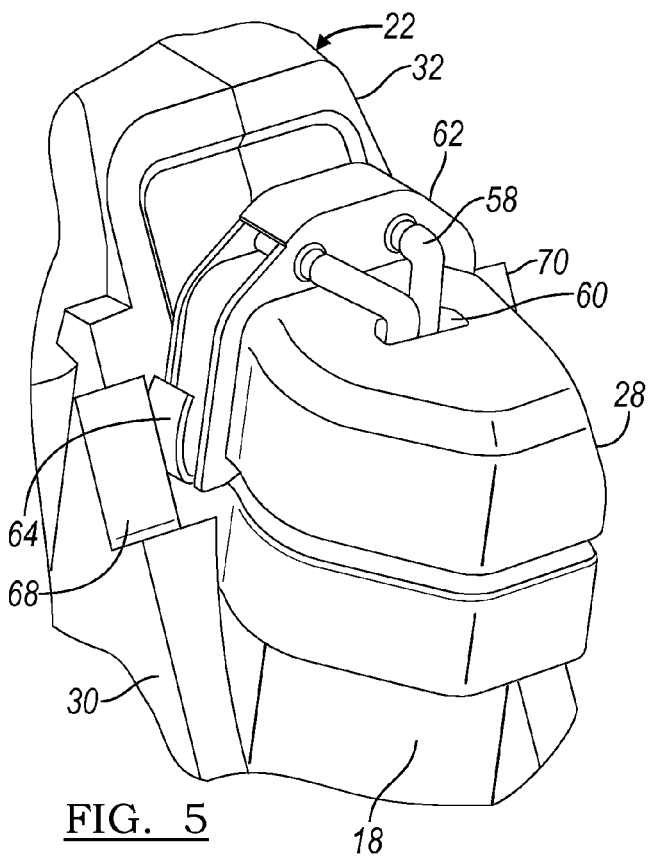
FIG. 5 is an enlarged perspective view of a portion of the head restraint assembly of FIG. 1, illustrating components of a power adaptation system.
Figure 6:
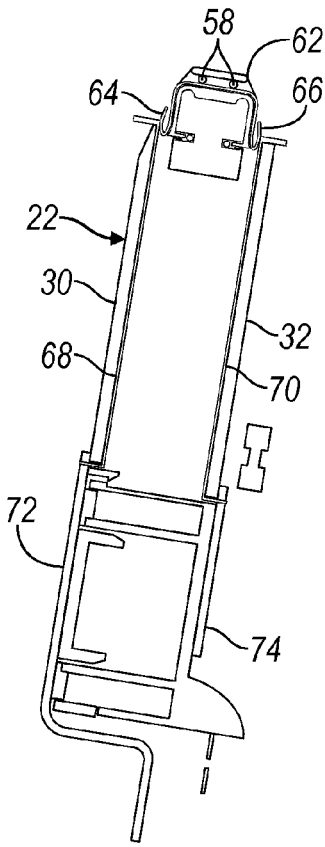
FIG. 6 is a partial section view of the head restraint assembly of FIG. 1, illustrating the power adaptation system.

The invention contemplates utilization of a power adaptation system for getting power to the motor 48. Referring to FIG. 1, a controller such as a body control module (BCM) 56 communicates with a power source and the motor 48. The BCM 56 controls the motor 48 via a cable 58 that extends through a hollow cavity in one of the support posts 18. Referring now to FIGS. 5 and 6, the cable 58 extends through an aperture 60 and the individual wires of the cable 58 plug into a connector 62. A pair of conductive brushes 64, 66 each extends from the connector 62 in the fore and aft directions. A pair of conductive contact strips 68, 70 is provided in the cavity 42 of the shells 30, 32 and extends longitudinally for engagement with one of the respective brushes 64, 66 during the range of translation of the shells 30, 32 relative to the transverse crossbar 28 and consequently the brushes 64, 66. The strips 68, 70 terminate beyond the range of translation as illustrated in FIG. 6. A pair of wires 72, 74 is each mounted to one of the contact strips 68, 70 and is connected to the motor 48 for providing power to the motor. This power adaptation system prevents extension or retraction of cables or wires as the head restraint 14 and consequently the motor 48 translate relative to the seat back 12. The brushes 64, 66 provide continuous contact with the contact strips 68, 70 for providing power to the motor 48.

The BCM 56 may control the motor 48 for gradual adjustment as selected by a manual control button provided somewhere within the vehicle, such as in the button assembly 26. During an impact condition, the BCM 56 may actuate the motor 48 for translation of the head restraint 14 at a greater speed for positioning the head restraint 14 in a safety position according to an embodiment. The flexibility of the power adaptation system permits various programming for the motor 48 for various seat vehicle designs.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A head restraint assembly comprising:
an upright guide adapted to be mounted to a vehicle body proximate to a seat back, the guide having a cross section;
a frame having a cavity with a cross section that is oversized relative the cross section of the guide cross section to receive the guide, wherein at least one of the guide and the frame has a plurality of projections extending to engage the other for providing guidance therebetween; and
a head restraint mounted to the frame for translation along the guide;
wherein the guide comprises a transverse body; and
wherein the guide further comprises a series of longitudinal ribs extending longitudinally in fore and aft directions from the transverse body for engaging the frame.

2. The head restraint assembly of claim 1 wherein the guide further comprises a pair of support posts adapted to be mounted to a vehicle body proximate to a seat back, wherein the transverse body is mounted to distal ends of each of the pair of support posts and extends between the pair of support posts.

3. The head restraint assembly of claim 2 wherein at least one of the pair of support posts has a round cross section with at least one flat formed therein; and
wherein the transverse body has a pair of cavities, each sized to receive the distal ends of the support posts.

4. The head restraint assembly of claim 2 wherein a central region of the transverse body extends longitudinally below the distal ends of the support posts for providing stability to the guidance of the frame.

5. The head restraint assembly of claim 4 further comprising:
a fixed nut mounted to one of the central region of the transverse body and the frame;
a motor mounted to the other of the central region of the transverse body and the frame; and
a threaded rod driven by the motor and engaged with the fixed nut such that rotation of the threaded rod translates the frame along the pair of posts.

6. The head restraint assembly of claim 5 further comprising a transmission connecting the motor and the threaded rod.

7. The head restraint assembly of claim 6 wherein the motor is mounted to the frame and oriented transversely relative to the support posts.

8. The head restraint assembly of claim 7 further comprising:
a pair of conductive brushes provided on at least one of the pair of posts; and
a pair of conductive contacts each mounted to the frame and in electrical communication with the motor, the contacts being in engagement with the brushes along a range of translation of the frame along the posts.

9. A head restraint assembly comprising:
an upright guide adapted to be mounted to a vehicle body proximate to a seat back;
a frame receiving the guide for translation of the frame along the guide;
a motor mounted to the frame and operably connected to the guide for translating the frame along the guide;
a pair of conductive brushes provided on the guide;
a pair of conductive contacts each mounted to the frame and in electrical communication with the motor, the contacts being in engagement with the brushes along a range of translation of the frame along the guide; and a head restraint mounted to the frame for translation along the guide;

wherein the guide comprises a pair of support posts; and wherein the pair of conductive brushes are mounted to a distal end of one of the pair of support posts.

10. The head restraint assembly of claim 9 wherein the one of the pair of support posts is hollow; and wherein the head restraint assembly further comprises wiring that is concealed within the hollow support post and in electrical communication with the pair of conductive brushes and a vehicle controller.

11. The head restraint assembly of claim 9 further comprising:

a fixed nut mounted to the upright guide; and a threaded rod driven by the motor and engaged with the fixed nut such that rotation of the threaded rod translates the frame along the upright guide.

12. The head restraint assembly of claim 11 further comprising a transmission connecting the motor and the threaded rod.

13. The head restraint assembly of claim 11 wherein the upright guide further comprises a pair of support posts.

14. The head restraint assembly of claim 13 further comprising a crossbar mounted to each of the pair of posts, wherein the fixed nut is mounted to the crossbar.

15. The head restraint assembly of claim 14 wherein the fixed nut is mounted centrally along the crossbar.

16. The head restraint assembly of claim 15 wherein the motor is oriented transversely relative to the support posts.

17. A head restraint assembly comprising:

an upright guide adapted to be mounted to a vehicle body proximate to a seat back, the guide having a cross section;

a frame having a cavity with a cross section that is oversized relative the cross section of the guide cross section to receive the guide, wherein at least one of the guide and the frame has a plurality of projections extending to engage the other for providing guidance therebetween;

a head restraint mounted to the frame for translation along the guide;

wherein the guide comprises a transverse body;

wherein the guide further comprises a pair of support posts adapted to be mounted to a vehicle body proximate to a seat back, wherein the transverse body is mounted to distal ends of each of the pair of support posts and extends between the pair of support posts;

wherein a central region of the transverse body extends longitudinally below the distal ends of the support posts for providing stability to the guidance of the frame;

a fixed nut mounted to one of the central region of the transverse body and the frame;

a motor mounted to the other of the central region of the transverse body and the frame;

a threaded rod driven by the motor and engaged with the fixed nut such that rotation of the threaded rod translates the frame along the pair of posts;

a transmission connecting the motor and the threaded rod;

wherein the motor is mounted to the frame and oriented transversely relative to the support posts;

a pair of conductive brushes provided on at least one of the pair of posts; and a pair of conductive contacts each mounted to the frame and in electrical communication with the motor, the contacts being in engagement with the brushes along a range of translation of the frame along the posts.

* * * * *